Sept. 29, 1970      A. KUNEVICIUS      3,531,348
METHOD OF MAKING PROTECTIVE AND DECORATIVE MOLDING
Filed Aug. 6, 1968      2 Sheets-Sheet 1
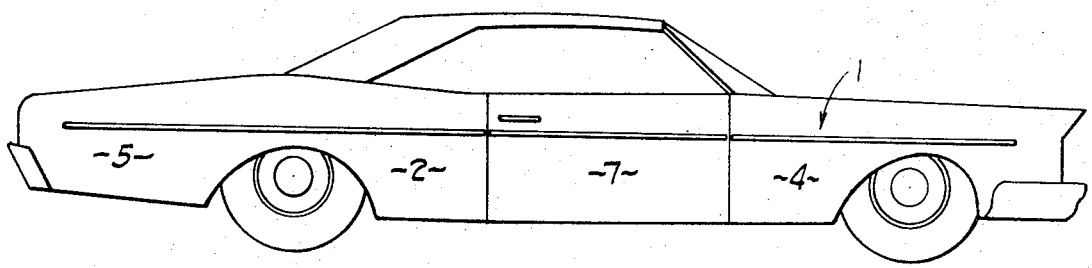
Fig. 1
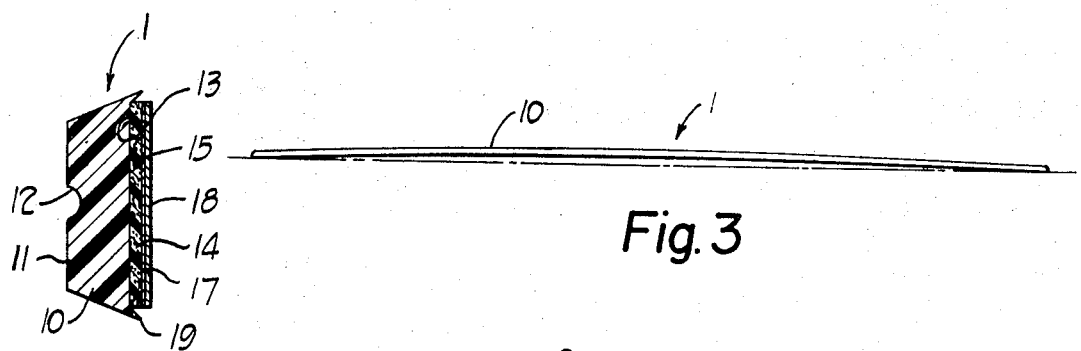
Fig. 2
Fig. 3
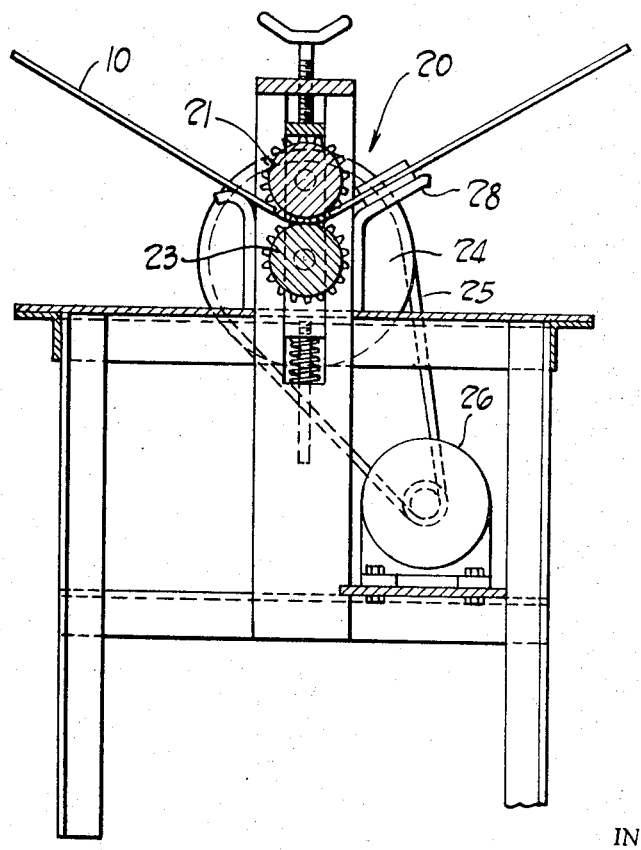
Fig. 4
INVENTOR.
ALEX KUNEVICIUS
BY Bosworth, Sessions,
Herrstrom & Cain
ATTORNEYS.

Sept. 29, 1970  A. KUNEVICIUS  3,531,348
METHOD OF MAKING PROTECTIVE AND DECORATIVE MOLDING
Filed Aug. 6, 1968  2 Sheets-Sheet 2

INVENTOR.
ALEX KUNEVICIUS
BY Bosworth, Sessions,
Herstrom + Cain
ATTORNEYS.

United States Patent Office 3,531,348
Patented Sept. 29, 1970

3,531,348
METHOD OF MAKING PROTECTIVE AND DECORATIVE MOLDING
Alex Kunevicius, Independence, Ohio, assignor to Custom Trim Products, Inc., Cleveland, Ohio, a corporation of Ohio
Continuation-in-part of application Ser. No. 601,473, Dec. 13, 1966, now Patent No. 3,439,950, which is a continuation-in-part of application Ser. No. 477,273, Aug. 4, 1965. This application Aug. 6, 1968, Ser. No. 750,691
Int. Cl. B32b 31/08; B29c 27/10
U.S. Cl. 156—164                    5 Claims

ABSTRACT OF THE DISCLOSURE

Method of making a self-adhering protective and decorative molding for motor vehicles and other purposes in which a flexible, resilient body member is prestressed and bowed; method for making such a molding in which the body member is preconditioned by preheating prior to application of a cushion member thereto; method and means for adhering the protected cushion member of such a molding to the body member by uniting the same at a predetermined angle to preserve the adhesive protective and method of simultaneous formation of the body member in such a molding and the decorative effect on an outer surface thereof.

CROSS-REFERENCE TO RELATED APPLICATIONS

This application is a continuation-in-part of applicant's co-pending application Ser. No. 601,473, filed Dec. 13, 1966, now U.S. Pat. No. 3,439,950 which, in turn, was a continuation-in-part of applicant's then co-pending application Ser. No. 477,273, filed Aug. 4, 1965, now abandoned.

BACKGROUND OF THE INVENTION

Field of invention

This invention relates to new and improved method and means for making a flexible and resilient, self-adhering, protective and decorative molding for motor vehicles, and the like.

Description of the prior art

A problem has long existed because of damage caused to the paint or finish, as by scratching or chipping, of vehicles, such as automobiles and the like, especially when struck by the door of an adjacent vehicle when that door is opened or to the door, and particularly the edge thereof, of the vehicles themselves should the door swing open against an adjacent vehicle, wall, post or the like, as in parking lots, parking garages, and similar locations where vehicles are parked and crowded closely together.

Even small nicks, scratches and chips are costly and expensive to repair and the problem of perfectly blending the patch into the rest of the vehicle surface is great. Yet for the average owner, as well as the person who takes pride in his automobile, the unsightliness of the damage to the finish due to such nicking, scratching and chipping and the loss of value to the vehicle as a consequence thereof is such that repairs to the finish cannot prudently be left undone, especially when relatively new or expensive vehicles are involved.

The problem has become aggravated in recent years because of the introduction of motor vehicles having sculptured, but plain, side lines which provide raised lines or surfaces extending longitudinally along the vehicle body, since such lines or surfaces not only often receive the initial impact from a door, or the like, of an adjacent vehicle opening against the side of the vehicle having them, but also, because of modern manufacturing practices which in some instances dictate that the vehicle be made and sold without metal trim, and the like, which would otherwise offer some protection to a vehicle, albeit such trim, itself, often damages an adjacent vehicle if a door upon which it is mounted swings thereagainst.

Further while protective moldings of various types and structure have been proposed in the past, they have not proven successful either because they were designed for only temporary adherence to the vehicle while the same was parked and removal therefrom during driving, which meant that the molding was easily removed and stolen, or because they were of complicated and/or expensive structure or were not decorative; or because they were difficult to install and use or didn't adhere to the vehicle with sufficient permanence, either because of their structure or because of vibration of the vehicle during use and operation.

Further, one of the reasons for failure to develop such moldings, despite the long felt need and search therefor, has been the inability to make such moldings in an economical manner and in such a way that they would have the necessary characteristics and performance ability both in use, installed on the motor vehicle, and during necessary handling, storage and shipping prior to use and during application upon the vehicle.

SUMMARY OF INVENTION

This invention comprises and has the general object of providing new and improved method and means for making protective and decorative moldings for motor vehicles and the like.

Other objects of this invention include the provision of a new and improved method and means for making protective and decorative moldings which is efficient and effective and provides an efficient and effective molding; which is economically used and practiced; which obtains unexpected and desirable results, in terms of the structure, characteristics, features, function and results of the molding produced thereby, not obtained by prior methods and/or means; which may be easily practiced by unskilled labor; which provides a molding having a long, useful and effective life both during handling and storage before installation on the vehicle or other surface to be decorated and/or protected and after installation; and which, in one part or phase, provides a molding which is prestressed or deformed longitudinally and curved or bowed inwardly, substantially uniformly throughout its length, so that an entire molding and any part or portion thereof, or part or portion of a said part or portion, is similarly prestressed and deformed and curved.

A still further object of this invention is to provide a new and improved process and means for making a protective and decorative molding for motor vehicles, and the like, obtaining one or more of the objects and advantages set forth above.

These and other objects and andvantages of this invention will become apparent from the following description thereof.

BRIEF DESCRIPTION OF THE DRAWINGS

FIG. 1 is a view of a protective and decorative molding made by method and means embodying this invention, in use on an automobile;

FIG. 2 is a vertical section, on an enlarged scale, of the molding of FIG. 1, before mounting on the automobile;

FIG. 3 is a side elevation on a reduced scale, of the molding of FIG. 2;

FIG. 4 is a partly schematic, vertical section of apparatus embodying and for practicing the method of this invention;

DESCRIPTION OF THE PREFERRED EMBODIMENTS

Figure 5:
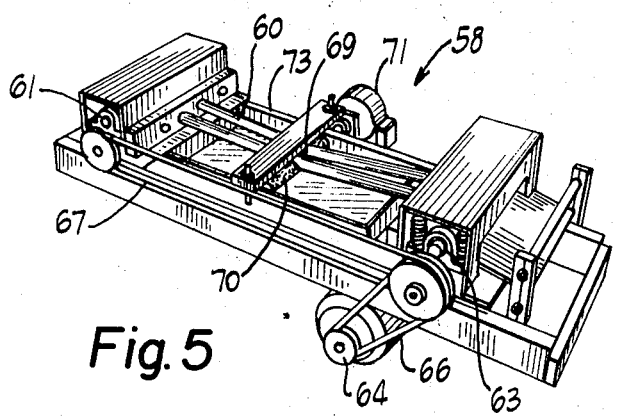
FIG. 5 is a perspective view of another apparatus embodying and useful in practicing the method of this invention.

A molding made according to a preferred form of this invention is indicated generally at 1, FIGS. 1, 2 and 3. Molding 1 is shown, FIG. 1, mounted and in use upon a motor vehicle 2. Motor vehicle 2 may take any desired form, but usually includes front and rear side or quarter panel sections, 4 and 5, respectively, and at least one door 7. Molding 1 is positioned on the vehicle, with respect to the side panels of the body and the door thereof in particular, so as, on the one hand, to receive and cushion blows and impacts which otherwise might be delivered against the surface of the vehicle by doors and other objects, as, for example, when the door of an adjacent vehicle is opened in a parking lot, parking garage and similar locations, and, on the other hand, to provide a protective and decorative cushion on the door of the vehicle so that when the door is swung open it will be protected from damage by and will protect any other surface, such as a wall, post or other vehicle, against which it might strike.

Molding 1 is shown extending longitudinally along the outermost bulge or projection of the door 7 and also extends along the front and rear side panels, 4 and 5, respectively, in a protective and/or decorative position, as the user may desire.

It is essential that molding 1 cushion and absorb impacts, shocks, and the like, without deleterious effect, over a wide range of temperatures; that molding 1 resist cold and brittleness resulting therefrom, deformation under heat and sunlight conditions; that the molding 1 withstand rain, snow and other precipitation and sunlight, day in and day out, all without adverse effect to its function as a protective device for the vehicle finish and as a decorative device to enhance the beauty and appearance of the vehicle; and that molding 1 resist dislodgment or loosening due to vibration of the vehicle while in use on the vehicle.

Thus, molding 1 must retain its impact-absorbing characteristics under all weather conditions, over a wide range of temperatures and after prolonged and varied exposure to the elements, such as rain, snow and sunlight, and likewise must retain its shape, color and beauty following the same weathering conditions and exposure and must adhere to the vehicle even though the surface thereof vibrates during operation thereof.

To this end the preferred form of molding 1 comprises a body portion 10, which is formed with an outer or exposed surface or surfaces 11 of any desired shape, so that a pleasing and decorative effect is or may be obtained, providing always that the thickness of the body portion is maintained sufficient to absorb the shocks and impacts, as described above, under the wide range of temperatures and weather conditions which are encountered during normal all-season use of the molding on vehicles.

As shown in FIG. 2, body 10 of molding 1 conveniently has a truncated outer surface or shape with a central longitudinal groove 12 and for purposes of decoration is conveniently made so that the body is of one color and the groove is painted or otherwise decorated in a contrasting color. Body 10 also has an inner surface 13 which is shown flat in FIG. 2, but may be shaped and/or formed to conform with a particular line, design or configuration upon which the molding is to be mounted.

More important, in the preferred form of this invention the inner surface 13 of body 10 is coated or covered with a layer or cushion 14 of softer, vibration-absorbing material, such as polyurethane, or the like.

Cushion 14 is disposed between the body member 10 of molding 1 and the vehicle, when the molding is mounted on the vehicle, and, being softer and more resilient and flexible than body member 10 and of cellular structure, functions to absorb vibrations occurring in the vehicle during the running and operation thereof, including those periods when the vehicle is at rest but the motor is running, so that the molding 1 is not detached from or jiggled off the vehicle due to vibrations in the surface upon which it is mounted.

Thus body 10 and cushion 14 cooperate, on the one hand, to protect and beautify the vehicle and, on the other hand, to maintain the molding on the vehicle and protect it against disengagement because of vibration in the vehicle, and more particularly, in the surface on which the molding is mounted. When the inner surface 13 of body 10 is shaped to complement a ridge, or the like, upon which the molding is to be mounted, the cushion 14 is, of course, similarly shaped.

In order to attach or mount the molding 1 on the vehicle, a coating of pressure sensitive adhesive 15 is applied to the exposed or inner surface 17 of cushion 14 and the adhesive 15 is, in turn, protected, during manufacture and handling, by a backing strip 18, of paper or other convenient material. Backing strip 18, is of course, removed from the molding 1 to expose the adhesive 15, when the molding is to be mounted or attached to the vehicle, leaving a molding comprising only the body 10, cushion 14 and adhesive 15.

Also, as shown in FIG. 1, body member 10 is conveniently formed with thin flaps or extensions 19 of the truncated sides which, on the one hand, hide and conceal the edges of the cushion 14 and, on the other hand, are thin and flexible enough so as not to interfere with the mounting of the molding on the motor vehicle surface and its adhesion thereto or with the function and operation of the cushion 14 in absorbing vibration of the motor vehicle.

The flaps 19 are conveniently and preferably made of the same color as the surface 11 of the body member 10 so that the edge of the cushion is covered by the same color and has a compatible decorative effect with the surface 11.

Molding 1 is made according to the method of one form of this invention by extruding the body member 10, in a conventional manner, of suitable plastic or other material of predetermined color.

Body member 10 is painted or otherwise decorated, in accordance with the teaching of this invention, and the cushion member 14 is then adhered or joined to the inner surface thereof. When so joined, the inner surface 17 of cushion member 14 preferably has already been provided with the adhesive 15 and backing strip 18. Cushion member 14 is adhered to body member 10 by means of a suitable pressure sensitive adhesive which, conveniently, is coated on the other (to be adhered) surface of the cushion 14. In order to improve adhesion between the cushion 14 and body member 10, the surface 13 of body member 10 is preferably cleaned and treated, by means of a suitable solvent, just prior to contact and engagement with the adhesive coated surface of cushion 14.

Body member 10 is prestressed or deformed and curved or bowed by passing it, preferably before the cushion 14 is adhered thereto, through suitable apparatus, indicated generally at 20, FIG. 4.

Apparatus 20 comprises a pair of rollers 21 and 23, suitably mounted and dirven by suitable means, such as pulley 24, belt 25 and motor 26 and provided with ingress and egress guides or guide means 28 and 29, respectively, set at a suitable predetermined angle, less than 180° to ensure that molding 1 is stressed and curved as and to the purposes described above. In the preferred form of apparatus for use with molding of the sizes described above, the rollers 21 and 23 are preferably 2″ in diameter and the guides 28 and 29 are at an angle of about one hundred twenty degrees (120°) with each other with guide 28 at an angle of about thirty degrees (30°) with the horizontal.

Figure 6:
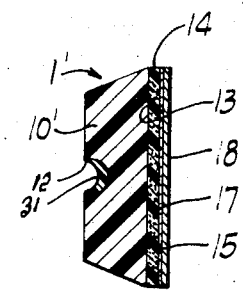
FIG. 6 is a vertical section of another molding made according to a prefered form of this invention.

The molding 1′ shown in FIG. 6, wherein like reference characters refer to like parts as in FIG. 2, is similar to the molding 1 described above, except that in this instance the molding has a body member 10′ that does not include the protective flaps 19 and has a feature stripe 31 in the groove 12, of complementary or contrasting color, which is made of the same or compatible material as the body member 10′ and is extruded simultaneously therewith so that the resultant body member is, in effect, an integral whole of two colors. Obviously, also, more than one decorative stripe 31 may be provided in body member 10′ and the multiple stripes 31 may be of the same or different colors. Further, stripes 31 may be located in one or more grooves 12, as shown, or in a flat or raised surface and/or on the side or in any desired location on the outer surface 11, as defined above, of the body member 10′ where they serve to obtain the objective of adding to the decorative effect of the molding 1′ as a whole.

Body member 1′ is formed, in accordance with this invention, by apparatus having a plurality of extruders, one for each color used, with the die forming the basic body member also receiving the extrusions of the striping in proper relation to the desired final structure and effect and extruding the multiple strands or portions so received as an integral whole with the stripes exposed in the surface 11 at the desired locations. Molding 1′ is then made from body member 10′ in the same way that molding 1 is made from body member 10.

Figure 7:
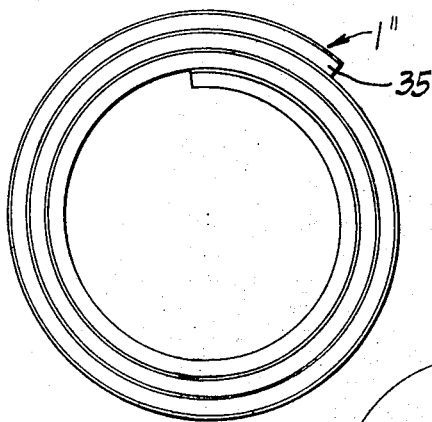
FIG. 7 is a plan view of a section of another molding made according to a preferred form of this invention.
Figure 8:
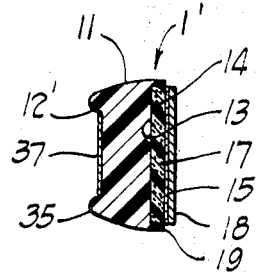
FIG. 8 is a vertical section, on an enlarged scale, of the molding shown in FIG. 7.

FIGS. 7 and 8 disclose another form of molding 1″ made according to the teachings of this invention but having a body 35 made of a material, such as a soft vinyl plastic, which is deformable and can be bent and coiled as shown in FIG. 7 for shipping and handling. In these figures, also, like reference numerals refer to like parts.

Body member 35 is also formed by extrusion and is cleaned, as described above, for application of the cushion 14 with the pressure sensitive adhesive 15 applied thereto and the protective, but removable, backing strip 18 over the adhesive. In this instance, however, the molding 1″ is not prestressed or bowed since the deformable nature of the body member 35 precludes the same. On the other hand, the pressure sensitive adhesive 15 must be covered and protected, if it is to remain viable, until the molding 1″ is applied to the vehicle or surface upon which it is to be used and so that it doesn't, prior to the time of desired use, inadvertently adhere to a surface, package or other place where it is unwanted.

However, the paper backing strip 18, which is also flexible, is not deformable, at least in the same manner and rate as the body member, and it does not expand, contract or fold and bend in response to external stimuli, temperature changes, and the like, at the same rate or in the same ratio.

Accordingly, if the cushion 14 with backing strip 18 is merely attached as described above with both body member 35 and the cushion and strip flat, the strip 18 is stressed and strained and breaks and snaps, if the molding is rolled for shipping as shown in FIG. 7, or buckles and becomes disengaged from the cushion 14 and adhesive 15 and subject to tearing and ripping of the molding 1″ if rolled in the opposite direction.

Accordingly, for moldings which are deformable and/or rolled for shipping and handling, the method of this invention, also, includes the step of applying the cushion and paper protective strip thereto while the body member 35 is at an elevated temperature near to, but below, that at which plastic deformation occurs to dimensionally stabilize the body member. The cushion 14 with adhesive 15 and backing strip 18 is then applied to the body member while both are under tension, bringing the two together tangently at an angle of preferably about thirty degrees, and between ten and seventy degrees, and immediately exerting a pressure thereon to secure adhesion therebetween and then rolling the molding formed by adhesion of the components into a coil of the desired diameter and size for shipping, care being taken to ensure that the body member travels through an arc greater than 50 degrees, less than 90 degrees and preferably of about 70 degrees, before the pressure is exerted upon the components as set forth.

The molding 1″, FIG. 8, also depicts another form of decorative effect which molding made according to this invention may have. In this instance, the outer surface 11 has a flat wide groove 12′ therein and a metallic foil 37 is disposed therein, being adhered to the body member 35 by a suitable adhesive, preferably pressure sensitive.

Figure 9:
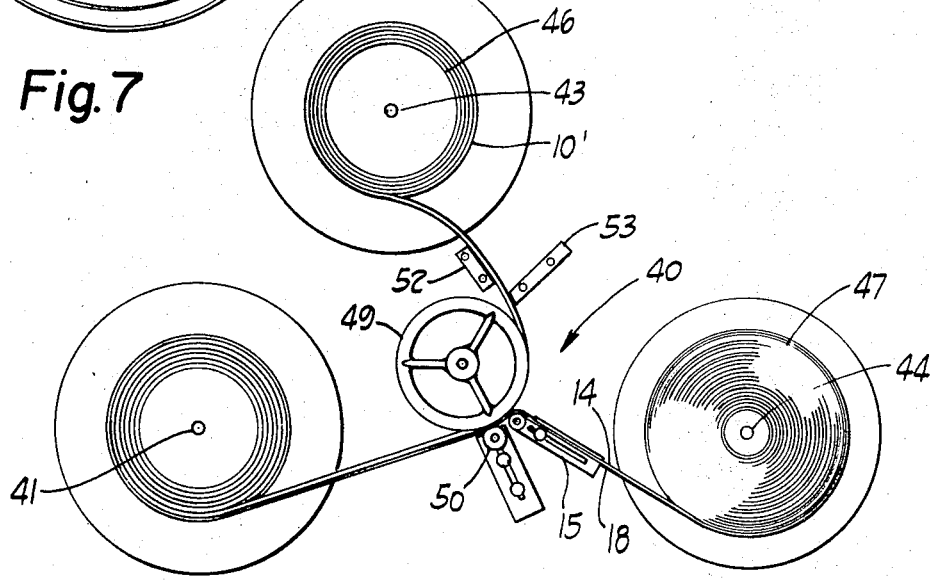
FIG. 9 is a plan view, partly schematic, of apparatus embodying and useful in practicing the method of this invention.

The apparatus, indicated generally at 40, FIG. 9, is suitable for applying the cushion 14 and backing strip 18 to the body member 35 and coiling the completed molding 1″ of the deformable type shown in FIGS. 7 and 8. Apparatus 40 includes a take-up reel or spindle 41, driven by a motor or other means, not shown, and two feed spindles, 43 and 44, respectively, upon which reels or coils 46 and 47 containing the body member 35 and cushion and backing strip assembly (hereinafter called cushion assembly) respectively, are disposed. Apparatus 40 also includes a central idler or bearing wheel 49 against which the components are disposed to form the molding 1″ and a pressure roller 50, which is adjustable, and which squeezes the body member and cushion assembly together against roller 49 to complete adherence and forming thereof into molding 1″. Roller 49 and feed spindles 43 and 44 are driven by the action of spindle 41 in pulling on the body member and cushion assembly and friction. The roller 49 and spindles 41, 43 and 44 are so positioned that the body member and cushion assembly are brought together as described above, under tension, at an angle of about 30°, squeezed together and coiled onto the takeup reel 41 as a completed molding without breaking or wrinkling the backing strip 18. Adjustable guides 52 53 and 55 are also, preferably provided to aid in guiding the body member and cushion assembly together in accordance with the teachings of this invention. Also, the roller 49 and guides 52, 53 and 55 may be grooved to better receive, guide and hold the body member and/ or cushion assembly.

The path of body member 35 on roller 49 should be about 70° (greater than 50° and less than 90°) before pressure roller 50 compresses and forces the components into the completed molding with roller 49 having a diameter of about 8½ inches and roller 50 having a diameter of about 1 inch.

As noted above, when the molding 1″ is assembled, the body member 35 is preferably at a temperature just below the point at which plastic deformation takes place, 140° F. for vinyl chloride, for example. Heating may be accomplished by a separate preheater or by heat applied directly over or to the apparatus 40 and, particularly, the feed spindle 43 and feed supply 46 of the body member, as by overhead heaters or lamps, or by passing the body member through the apparatus 40 while it still retains heat from its original extrusion.

Note, also, that any molding made according to this invention, whether the body portion 10, 10′ or 35 be deformable or not, may have an outer surface 11 of any desired configuration and color and may or may not have extruded stripes as in FIG. 6, flaps as in FIG. 2, foil decorative strip as in FIG. 8 or painted stripes as referred to above.

Also, as noted above, before the cushion 14 is applied thereto, the inner surface of the body member, be it deformable or not, is cleaned, if necessary. Such cleaning may be done, if desired, in the apparatus shown in FIG. 5 and indicated generally at 58.

Apparatus 58 includes one or more tubes or conduits 60, two shown, in which the body member or members are conducted through the apparatus by pinch rollers 61 and 63 at the ends, respectively, of the apparatus. The rollers 61 and 63 are driven by suitable means, such as motor 64 and chains or belts 66 and 67. Each tube 60 is provided with an aperture 69 intermediate its length and a brush 70, driven in any suitable means such as motor 71 is disposed adjacent the apertures 69 so that the bristles will extend into the tubes, respectively, as the brush rotates. Apparatus 58 also includes a tray 73 for reception of cleaning fluid and positioned so that the bristles of brush 70 rotate therein also. In use the brush is rotated while a body member 10, for example, is pushed into the rollers 61 which force it into the tube 60 with the inner surface 13 of the body member positioned so as to be engaged by brush 70, as the brush rotates, to clean the said surface. Once engaged by the body member, rollers 63 also help move the body member through the apparatus and, in particular, the tubes. The cleaner also preferably acts as a solvent to facilitate adhesion of the pressure sensitive adhesive when the cushion is applied thereto. Obviously, successive body members may be fed into the apparatus as desired and the tubes 60 may each have a body member therein for cleaning at the same time.

Cushion 14 in assembly with backing strip 18 is then applied to the body member, preferably after the same is prestressed, where coiling for shipping is not a consideration, as in FIGS. 3 and 6, by feeding the two components together through a pinch roller in a conventional manner.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:
1. A method of making a cushioned protective and decorative molding from (1) an elongated, flexible, deformable thermoplastic body member and (2) a cushion member assembly, said assembly comprising a cushion member having a first surface with an adhesive thereon and a second surface with a pressure sensitive adhesive thereon and a removable backing strip covering said pressure sensitive adhesive, said backing strip having a different flexibility and co-efficient of expansion from said body member, said method comprising the steps of advancing said body, under tension, through an arc determined by a roller means, bringing said body member and assembly together, under tension, at a predetermined angle, advancing said body member and assembly between said roller means and pressure roller means, to adhere said body member and assembly together to form said molding, and coiling said molding while maintaining said backing strip taut without breaking the same.

2. The method according to claim 1 in which said predetermined angle is between 10 and 70 degrees.

3. The method according to claim 2 in which said body member has an arcuate travel of greater than 50° and less than 90° about an arc having about a four inch radius.

4. The method according to claim 1 in which said body member is at a temperature near but below the temperature of plastic deformation when brought into contact with said assembly.

5. The method according to claim 4 in which said body member is of deformable vinyl chloride.

References Cited

UNITED STATES PATENTS

| | | | |
|---|---|---|---|
| 2,560,038 | 7/1951 | Trainer | 264—288 X |
| 2,690,206 | 9/1954 | Mueller | 156—244 X |
| 3,038,217 | 6/1962 | Harris. | |
| 3,081,212 | 3/1963 | Taylor et al. | 156—229 X |
| 3,147,176 | 9/1964 | Haslam | 161—39 |
| 3,216,164 | 11/1965 | Stillman. | |
| 3,273,941 | 9/1966 | Skidmore | 301—5 |
| 3,400,040 | 9/1968 | Osgood. | |
| 3,060,503 | 10/1962 | Eckert | 264—285 |

JOHN T. GOOLKASIAN, Primary Examiner

R. A. KILLWORTH, Assistant Examiner

U.S. Cl. X.R.

156—192, 229; 264—288

UNITED STATES PATENT OFFICE
CERTIFICATE OF CORRECTION

Patent No. 3,531,348            Dated September 29, 1970

Inventor(s) Alex Kunevicius

It is certified that error appears in the above-identified patent and that said Letters Patent are hereby corrected as shown below:

In the drawing, Sheet 2, Figure 8, the reference character "1′" should read -- 1″ --; Figure 9, the reference character "10′" should read -- 35 --.

Signed and sealed this 7th day of December 1971.

(SEAL)
Attest:

EDWARD M. FLETCHER, JR.          ROBERT GOTTSCHALK
Attesting Officer                 Acting Commissioner of Patents